INVENTORS
DONALD A. CAMPBELL
WILBERT SPREHE
ATTY.

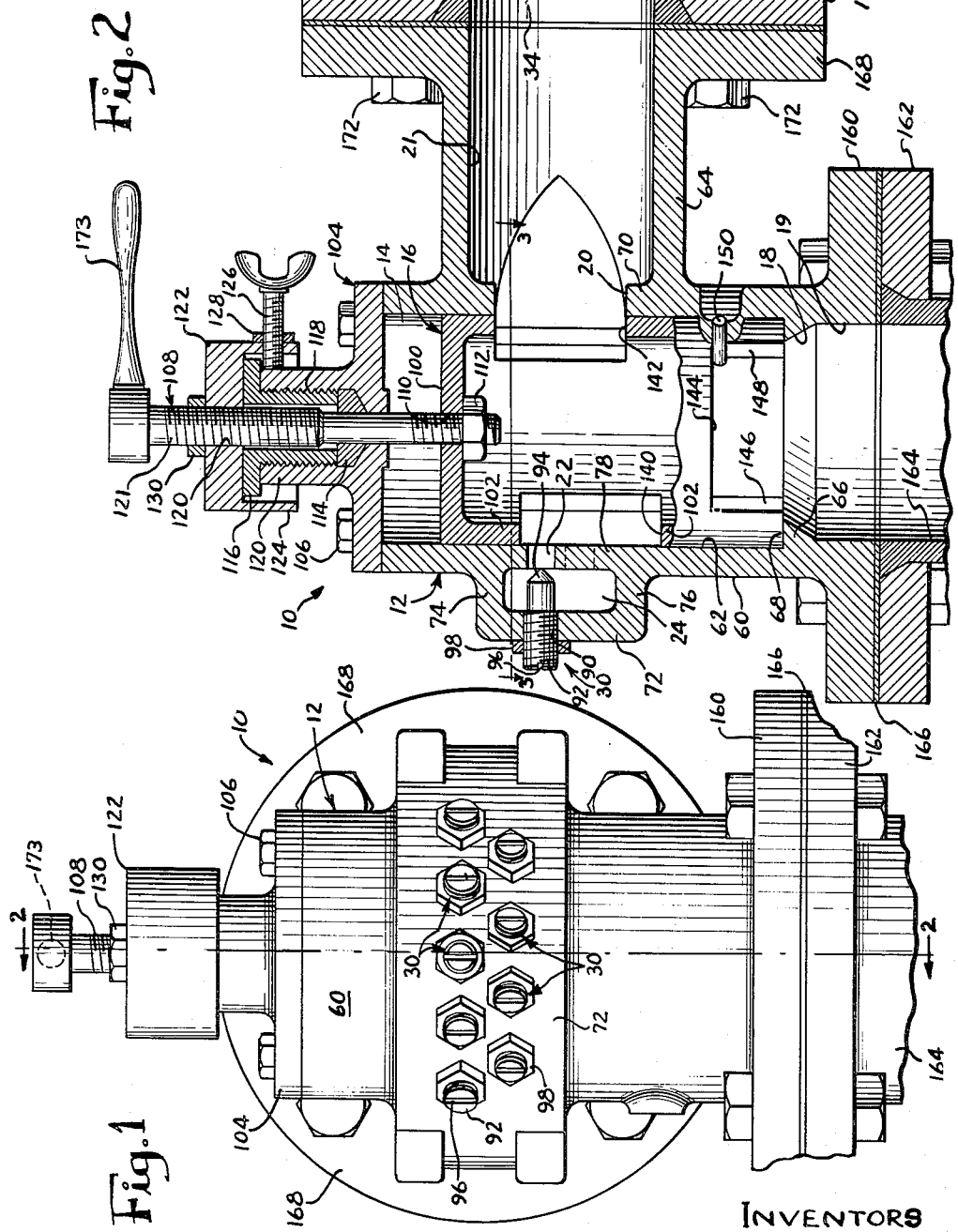

Aug. 29, 1961  D. A. CAMPBELL ET AL  2,998,023
CONTROL VALVE WITH VARIABLE FLOW CHARACTERISTICS
Filed Feb. 11, 1958  3 Sheets-Sheet 3

INVENTORS
DONALD A. CAMPBELL
WILBERT SPREHE
by: Fred Gerlach ATTY.

United States Patent Office 2,998,023
Patented Aug. 29, 1961

2,998,023
CONTROL VALVE WITH VARIABLE FLOW
CHARACTERISTICS
Donald A. Campbell, Rockford, Ill., and Wilbert Sprehe, Alhambra, Calif., assignors to Eclipse Fuel Engineering Co., Rockford, Ill., a corporation of Illinois
Filed Feb. 11, 1958, Ser. No. 714,548
17 Claims. (Cl. 137—599)

The improved control valve comprising the present invention has been designed for use primarily in connection with the controlling of the flow of one of the gaseous constituents of a combustible mixture, for example, fuel-gas or air, to a mixing device or the like, preparatory to conducting the combustible mixture to the burner or burners of an industrial furnace, oven, boiler and the like such as may be encountered in metal heat-treating, melting, annealing and similar operations, as well as in steam generating, hot water heating and other processes too numerous to mention. The invention is, however, capable of other uses and the same may, if desired, with or without modification, be employed for proportioning without mixing, the flow of a gas or a liquid in accordance with the demand therefor so that the flow of the gas or liquid may be made to match the flow of a different gas or liquid ultimately to be combined with the first gas or liquid. For example, the present control valve construction may be utilized for causing the flow of a combustible gas to match the variable flow of air passing through a butterfly valve or through a valve having a square port. Irrespective, however, of the particular use to which the present invention may be put, the essential features thereof are at all times preserved.

The proper control of the proportioning of gaseous fuel and air for the purpose of obtaining a combustible fuel-air mixture which will conform to all phases of furnace operation and which will produce a uniformly efficient controlled furnace atmosphere at any given instant presents numerous factors which must be reckoned with. Principal among these are changes in internal furnace pressure caused by an increase or a decrease in the firing rate of the furnace burners, changes in frictional resistance offered to the gas or air manifold piping or other passages due to changes in the rate of flow of these gaseous media with the same, and changes in the pressure at which either the air or the gas, or both, are supplied to the proportioning device. These factors, for reasons that are well known and which need not be discussed in detail herein, contribute toward erratic performance of a given burner system in the absence of any means for adjusting the fuel air ratio to produce the proper combustible mixture which will produce optimum results and give the desired character of flame in both low and high firing range of the burner. Where two combustible constituents, for example, fuel-gas and air, are fed to a mixing type burner such as a ring burner or the like through separate valves with the movements of both valves being correlated, either by a linkage connection between the movable control handles of the two valves, or by an automatic control common to both valves, it is necessary for proper and efficient operation of the burner that the flow characteristics of the two valves be perfectly matched. The selection of valves having matching fuel flow characteristics is not feasible in many industrial installations where changeovers are prevalent, since it would be necessary under such conditions to maintain on hand a large number of pairs of valves having matching fluid flow characteristics. In the absence of such pairs of matched valves, the rate of change in the fuel ratio as the two valves are progressively and simultaneously opened will not give the desired character of flame in both the high and low firing range of the burner.

The present invention is designed to overcome the above noted limitations that are attendant upon the use of conventional fuel-gas and air valve arrangements for separately controlling the flow of combustible constituents to a mixing burner and, toward this end, it contemplates the provision of a novel form of control valve which may be used to regulate the flow of either fuel-gas or air and which has associated therewith means for regularly adjusting the flow characteristics of the fluid passing therethrough so that these flow characteristics may be caused to match the flow characteristics of its counterpart valve or to predeterminably deviate from such flow characteristics of the counterpart valve to satisfy the fuel air requirements of any given burner installation. In other words, a control valve constructed in accordance with the principles of the present invention is capable of initial adjustment by empirical methods or by precalculation to match the flow characteristics of a companion valve, or to present flow characteristics which differ from the flow characteristics of the companion valve, by increments or decrements of fuel flow throughout the range of opening and closing movements of the two valves which may be dictated by various factors such as pressure differentials, variations in specific gravity of the fluids involved, orifice size, changes in frictional resistance offered to the fluids in the piping thereof and other factors too numerous to mention.

The provision of a control valve of this character being among the principal objects of the invention, another object thereof is to provide a control valve in which the flow characteristics of the fluid passing therethrough upon progressive opening of the valve may be changed at will throughout the entire range of any given burner operation in accordance with a predetermined pattern of operation by effecting certain initial adjustments thereof so that, thereafter, the same pattern by which the flow characteristics of the valve matches or differs from the flow characteristics of its companion valve will prevail throughout the entire range of opening and closing movements of which the two valves are capable.

A more specific object of the invention is to provide a control valve of this sort including a valve casing providing a valve chamber therein having a fluid inlet and a fluid outlet, and in which casing there is rotatably disposed a valve member movable from one extreme position wherein the fluid inlet and fluid outlet are in full communciation with each other, progressively through a range of decreased fluid flow, to another extreme position wherein the fluid inlet and fluid outlet are substantially out of communciation with each other, and wherein the casing is provided with a plurality of adjustable by-pass openings so arranged that they are successively cut off, so to speak, by the rotary valve member as it moves from its extreme position to its second extreme position and which by-pass openings serve, proir to the point at which they are cut off, to admit additional quantities of the fluid from the fluid inlet to the discharge region of the fluid outlet so that the flow characteristics of the valve structure as a whole during closing movements of the valve may be tapered within certain limits in accordance with a predetermined flow pattern.

Another object of the invention is to provide a valve construction of the character briefly outlined above in which the rotary valve member, in addition to the adjustments which are effected as the valve is moved between its open and closed positions, is capable of initial adjustment bodily in the valve chamber throughout an infinite range of adjustments by means of which the full flow capacity of the valve may be varied to accommodate the operating capacities of any companion valve with which the present control valve may be associated in effecting a proportional flow of different fuel constituents to a mixing burner or the like.

The provision of a control valve which is relatively simple in its construction, consisting as it does of but a single main casting and which, therefore, may be manufactured at a relatively low cost; one which is possessed of a minimum number of moving parts and which, therefore, is unlikely to get out of order; one which may readily be disassembled and reassembled for purposes of inspection, replacement of parts or repair; one which is rugged and durable and which, therefore, is possessed of a relatively long life; one which readily lends itself to either automatic or manual operation, and one which otherwise is well adapted to perform the services required of it, are further desirable features which have been borne in mind in the production and development of the present invention.

With these and other objects in view, not at this time enumerated, and which will become more readily apparent as the nature of the invention is better understood, the invention consists in the novel construction, combination, and arrangement of parts shown in the accompanying three sheets of drawings forming a part of this specification.

In these drawings:

FIG. 1 is a side elevational view of a control valve constructed in accordance with the principles of the present invention;

FIG. 2 is a sectional view taken substantially along the line 2—2 of FIG. 1 and showing the valve structure in its fully open position for maximum fluid flow between the fluid inlet and the fluid outlet thereof;

FIG. 7 is a schematic view illustrating the manner in which the present control valve may be operatively associated with a companion valve for proportionately regulating the flow of two fluid fuel constituents from their respective sources to a mixing burner associated with a furnace or the like.

Figure 7:
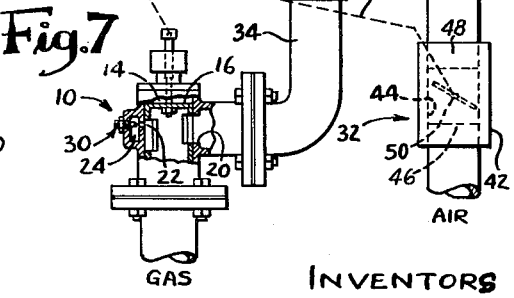

Referring now to FIG. 7 wherein an exemplary installation of the present control valve has been schematically portrayed, the control valve is designated in its entirety at 10. Briefly, the valve includes a valve casing 12 (see also FIGS. 1 and 2) defining an internal valve chamber 14 within which there is disposed a rotary valve sleeve 16 a portion of which is operatively interposed between a fluid inlet port 18 leading from an inlet passage 19 and a fluid outlet port 20 leading from an outlet passage 21. A series of by-pass ports 22 establish communication between the valve chamber 14 and an arcuate chamber 24 which partially encircles the chamber 14 and which communicates with the fluid outlet 21 of the valve casing 12. The flow of fluid from the valve chamber 14 outwardly through the various by-pass ports 22 may be selectively regulated by a series of needle valve assemblies 30, one for each by-pass opening 22, and the valve sleeve 16 is so designed that upon turning movement of the same to effect either opening or closing movements of the outlet port 20, it will progressively uncover or cover these various by-pass ports 22 so that additional increments or decrements of fluid flow will be added to or detracted from the total volume of fluid passing directly from the fluid inlet passage 19 to the fluid outlet passage 21. By adjusting the various needle valve devices 30, the flow characteristics of the valve assembly 10 may thus be varied and caused to match the flow characteristics of a companion valve such as the valve which has been designated in its entirety at 32 in FIG. 7. In the exemplary illustration of FIG. 7, the control valve 10 of the present invention is adapted to regulate the flow of one of the gaseous constituents of a combustible mixture, for example, fuel-gas, from a source of supply of the gas through a fuel line 34 to a mixing burner 36 associated with a furnace 38 or similar installation. The valve 32 is illustrated as regulating the flow of the other constituent, for example, air, from a suitable source through a line 40 to the burner 36. The valve 32 forms no part of the present invention and it may be of any conventional design. In the present illustration of FIG. 7, this valve is shown as having a valve casing 42 providing a passage 44 extending therethrough from an air inlet 46 to an air outlet 48. The air inlet 46 communicates with the source of air while the air outlet 48 communicates with the line 40. The flow of air through the passage 44 is regulated by means of a valve element 50 of the butterfly type. Valves of this type ordinarily do not have a straight line flow characteristic, and, generally speaking, at the beginning of the opening movements of the valve member, there will be a much greater increase in the flow of fluid therethrough than will occur during the movements of the valve through its mid position. The control members for the valves 10 and 32, respectively, are operatively connected together for operation in unison, either manually or automatically, by a linkage or other system which has been schematically designated at 52 and, according to the present invention, the various adjustable needle valve assemblies 30 are adjusted relative to their respective by-pass openings 22 so that the flow characteristics of the control valve 10 will closely approximate the flow characteristics of the valve 32. It will be understood, of course, that for companion valves 32 having different flow characteristics, the control valve 10 will be adjusted to match the "taper" of the companion valve throughout the entire range of its opening and closing movements, all in a manner that will be set forth in detail presently.

Referring now to FIGS. 1 and 2, specifically, the casing 12 of the control valve 10 is comprised of a single casting having a cylindrical section 60 providing a vertical cylindrical bore 62 open at its upper and lower ends and defining the valve chamber 14. The lower end of the bore 62 constitutes the inlet portion 19 for the valve. A horizontal cylindrical section 64 extends radially outwardly from the medial regions of the vertical cylindrical section 60 and defines the outlet passage 21 which communicates with the conduit 34 (FIG. 7). An internal rib 66 defining a shoulder 68 establishes the gas inlet port 18 while a similar rib 70 establishes the gas outlet port 20.

Figure 3:
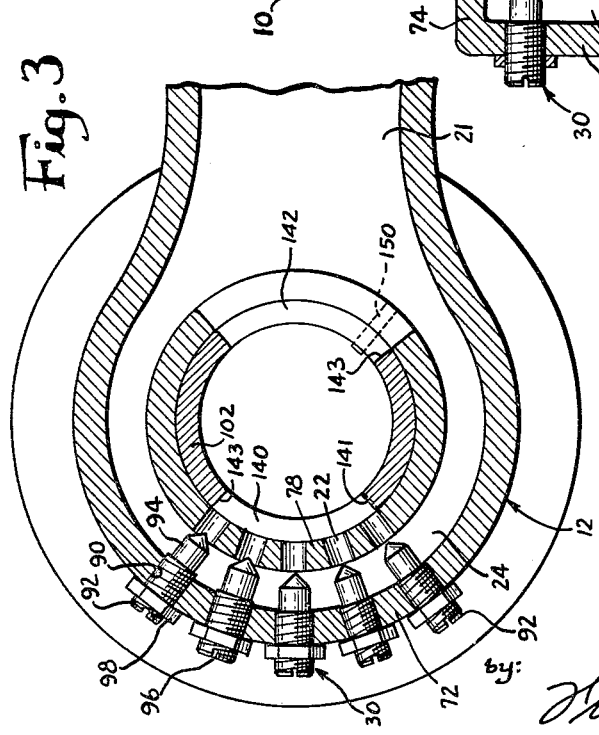
FIG. 3 is a fragmentary sectional view taken substantially along the line 3—3 of FIG. 2.
Figure 5:
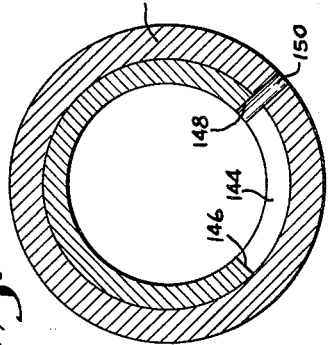
FIG. 5 is a sectional view taken substantially along the line 5—5 of FIG. 4.

An arcuate outer wall 72 of approximately 270° extent is offset radially outwardly from the cylindrical wall 60 of the valve casing 12 and, in combination with top and bottom walls 74 and 76, respectively, defines the arcuate gas chamber 24 which partially surrounds the valve chamber 14. As best seen in FIG. 3, the ends of the arcuate chamber 24 communicates with the gas discharge or outlet passage 21. The inner wall of the arcuate chamber 24 has been designated at 78, this wall constituting a continuation of the cylindrical wall 60 and the casing 12. The various by-pass ports 22 extend through the wall 78 and they are arranged in two horizontal rows with the ports of each row being circumferentially spaced equally from one another. While in the present embodiment of the control valve 10 eight such by-pass ports have been illustrated for exemplary purposes, it will be distinctly understood that a greater or lesser number of such ports may be provided if desired and that these ports may be arranged in one or more rows as desired. As best seen in FIG. 1, the various ports 22 in the two rows of such ports are disposed in staggered relationship in respect to each other and they are preferably, but not necessarily of such size and disposition that, in either horizontal direction, as seen in FIG. 1, the trailing edge of each port slightly leads the leading edge of the next adjacent port in the adjacent row of ports for a purpose that will be made clear presently.

The outer arcuate wall 72 is provided with a series of threaded openings 90 therethrough, one opening for each by-pass port 22, with the respective openings 90 and ports 22 being arranged in horizontal alignment. Threadedly received in each opening 90 is an adjusting screw 92 forming a part of the previously mentioned needle valve assembly 30 and the inner end of which constitutes a needle valve proper 94 designed for cooperation with its respective by-pass port 22. The outer end of each adjusting screw 92 is slotted as at 96 for reception of a suitable tool such as a screwdriver or the like whereby the extent of threaded reception of the adjusting screw in the wall 72 may be regulated to vary the extent of cooperation of the needle valve proper 94 with the by-pass port 22. A lock nut 98 is threadedly received on each adjusting screw 92 to maintain the latter in any desired position of adjustment.

Figure 4:
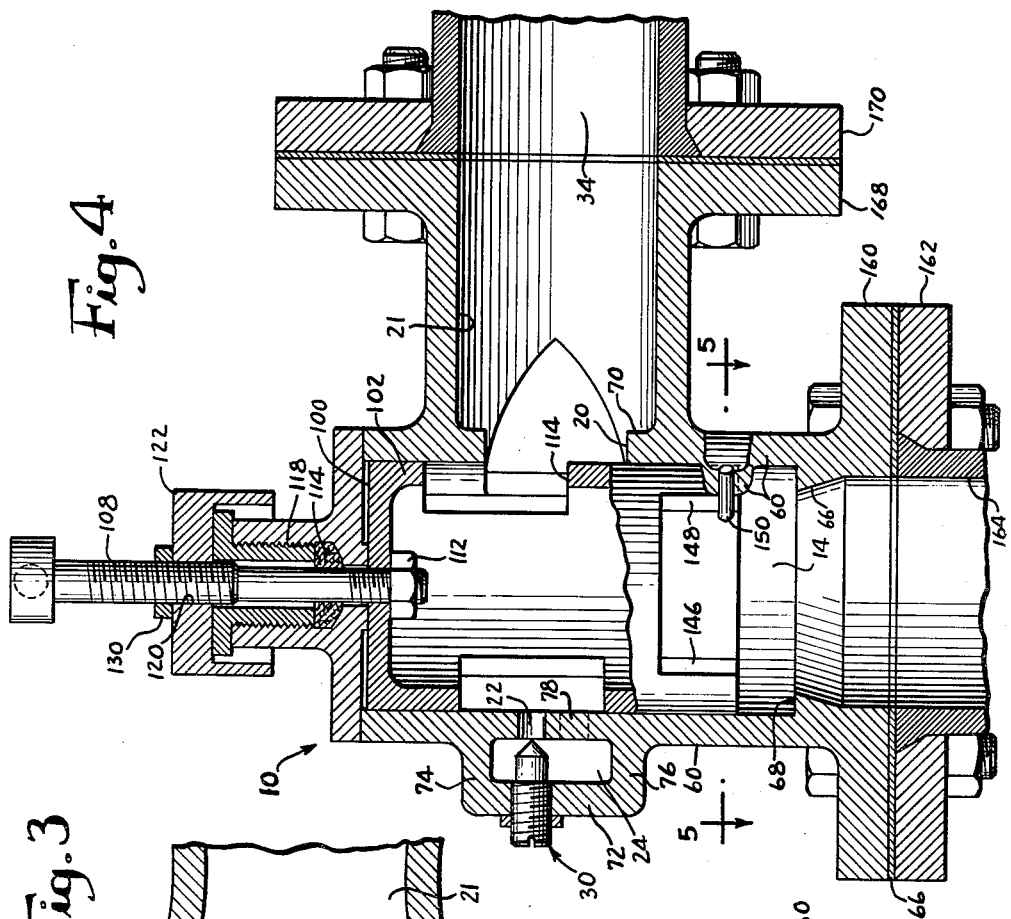
FIG. 4 is a sectional view similar to FIG. 2 with the valve parts disposed in a different position.

Still referring to FIG. 2, the valve sleeve 16 which operates within the valve chamber 14, is provided with a piston-like head portion 100 and a depending cylindrical sleeve portion 102, the vertical extent of which is somewhat less than the height of the valve chamber 14. The valve sleeve 16 is movable between a lower extreme position as shown in FIG. 2 wherein the lower rim of the sleeve portion 102 thereof seats upon the upwardly facing shoulder 68 and an elevated extreme position wherein the head portion 100 thereof engages a closure member 104 which extends across the upper open end of the cylindrical portion 60 of the valve casing 12 and wherein the lower rim of the sleeve portion 102 is elevated from the shoulder 68 as shown in FIG. 4. The sleeve valve 100 is also capable of turning movement within the valve chamber 14. The mechanism by means of which both the vertical and rotational movements of the sleeve valve 16 may be effected is operatively carried by the closure member 104 and its nature and function will be described in detail subsequently. As will also become clear presently, elevational movements of the sleeve valve 16 are resorted to to vary the capacity of the valve structure 10 as a whole while rotational movements thereof are resorted to in any position of elevation of the valve, to increase or decrease the flow of gas through the valve casting from the inlet passage 19 to the outlet passage 21.

The closure member 104 is in the form of an end plate which is removably secured to the upper end of the vertical cylindrical portion 60 of the casing 12 by clamping bolts 106. An operating shaft 108 has its lower end threadedly received as at 110 in the central region of the piston-like head 100 of the sleeve valve 16 and secured in position therein by means of a lock nut 112. The operating shaft 108 projects through the closure member 104 and through a packing gland including suitable packing material 114 and a gland nut 116, threadedly received as at 118 in a cylindrical gland cup 120 integrally formed as a part of the closure member 104. The gland assembly just described is provided for the purpose of preventing leakage of gas upwardly and outwardly from the valve chamber 14 around the operating shaft 108.

The upper region of the operating shaft 108 is threaded as at 121 and receives thereover an adjusting nut 122 having a depending sleeve portion 124 surrounding the gland nut 116 and upper portion of the gland cup 120. Turning movement of the adjusting nut 122 in one direction or the other will serve to elevate or lower the operating shaft 108 and consequently vary the elevational position of the sleeve valve 16 within the valve chamber 14. A set screw 126 is threadedly received through the sleeve portion 124 of the adjusting nut 122 and is engageable with the outer cylindrical surface of the gland cup 120 in order to lock the adjusting nut 122 in any desired position of adjustment. A lock nut 128 is provided for locking the set screw 126 in position and a lock nut 130 is also provided on the operating shaft 122.

Referring now to FIGS. 2 and 3, the sleeve portion 102 of the valve 16 is provided with a pair of diametrically opposed openings or ports 140 and 142, respectively, the port 140 being designed for selective register with the various by-pass ports 22 and the port 142 being designed for varying degrees of register with the outlet port 20 provided in the wall portion of the valve casing 12. In the illustrated form of the valve 10, the ports 140 and 142 each have a circumferential arcuate extent of approximately 90°, although it may be spanned by these ports if desired. The vertical extent of the port 142 is equal to the vertical extent of the outlet port 20 as clearly shown in FIG. 2, while the vertical extent of the port 140 is somewhat greater than the overall vertical extent of the two rows of by-pass ports 22. When the lower rim of the sleeve portion 102 is seated on the shoulder 68, i.e., when the sleeve valve 160 is in its lower extreme position, the port 142 is in precise vertical register with the outlet port 20. In this position of the sleeve valve 16, as well as in all vertical positions thereof, the port 140 will remain in vertical register with the two rows of by-pass ports 22.

The lower edge of the skirt portion 102 of the sleeve valve 16 is formed with a cut-away portion 144 in the form of a rectangular notch having vertical side edges 146 and 148, respectively. The height or depth of the notch 144 is at least as great as the vertical displacement of which the valve 16 is capable. A limit stop pin 150 projects through the cylindrical wall 60, is fixedly secured therein, has its inner end portion projecting into the slot 144, and is adapted to be selectively engaged by the vertical edge portions 146 and 148 of the slot 144 to limit the extent of turning movement of the sleeve 16 within the valve chamber 14 in any position of vertical adjustment of the sleeve. The circumferential arcuate extent of the slot 144 is approximately 90° so that when the pin 150 is in engagement with the vertical edge 148 of the slot, the sleeve port 142 and the outlet port 20 will be in full register so that maximum gas flow through the valve casing 12 from the inlet passage 19 to the outlet passage 21 will obtain. When the pin 150 is engaged by the vertical edge 146 of the slot 144, the two ports 142 and 20 will be out of register so that there will be no flow of gas outwardly from the valve chamber 14 through the port 20.

As shown in FIGS. 2 and 4, the gas inlet region of the valve casing 12 is provided with a radial flange 160 designed for mating engagement with a bolting flange 162 by means of which the supply conduit 164 may be connected to the valve structure 10, a suitable gasket 166 being interposed between the two flanges 160 and 162. It will be understood, of course, that the inlet region of the casing 12 may be interiorly threaded for threaded reception of the supply conduit 164 if desired. Similarly, the outlet region of the casing 12 is flanged as at 168 for similar reception of a bolting flange 170 associated with the conduit 34 leading to the burner 36. Suitable clamping bolts 172 are provided for securing the various flanges 160, 162, and 168, 170 in position.

In the operation of the above described valve structure 10 where full capacity flow of gas through the valve is desired to match the flow characteristics of a given air valve such as the valve 32, the adjusting nut 122 will be turned to such a position that the lower edge of the sleeve portion 102 of the sleeve valve 116 rests upon the shoulder 68 as shown in FIG. 2 and the adjusting nut 122 will be locked in position by means of the set screw 126 and lock nut 130. The individual needle valve adjusting devices 30 will be adjusted to obtain the desired flow characteristics through the valve casing 12 and these adjustments may be effected empirically during a test run of a particular installation to establish the necessary modification of fuel air adjustment for the different stages of fuel and air flow through the two valves 10 and 32 whereby the mixture resulting from such proportioning of the gas and air will be of a uniform consistency throughout each increment of rotary motion of the sleeve valve 60, it being understood, of course, that such increments of rotary motion will be applied through the linkage mechanism 52 (FIG. 7) to effect increments of opening or closing motion of the butterfly or other control valve member 44 associated with the valve 32. For exemplary purposes, the operating shaft 108 is shown as being provided with a manipulating handle 173, the turning movements of which will effect turning movements of the shaft 108 as well as of the operating shaft associated with the valve 32 by virtue of the linkage mechanism 52. With the handle 172 in the position wherein it is illustrated in FIG. 2, and with the sleeve valve 16 in its lowermost position, the two ports 142 and 20 are in full register to permit maximum gas flow through the valve structure directly from the inlet passage 19 to the outlet passage 21. At the same time, the arcuate port 140 provided in the wall of the sleeve portion 102 of the valve 16 is in full register with all of the by-pass ports 22 so that a parallel flow of gas radially outwardly from the inside of the sleeve portion 102 through all of the by-pass ports 22, or at least through such by-pass ports as are not completely closed by their respective needle valve structures 30 will take place. Such gas as passes through the ports 22 enters the arcuate chamber 24 and flows around the cylindrical wall 78 of the chamber 24 on opposite sides thereof and comingles with the gas leaving the chamber 14 through the port 20. Thus, for any given setting of the various needle valve structures 30, maximum gas flow through the valve structure 10 will prevail. As the operating handle 172 is manipulated to progressively decrease the area of register between the port 142 and the gas outlet port 20 by a rotary cut-off action, the trailing edge 141 (FIG. 3) of the arcuate slot or port 142 will progressively close off the first by-pass port 22, i.e., the extreme right hand port 22 illustrated in FIG. 1, so that in addition to the decrement of gas flow through the port 20 an additional decrement of gas flow will be subtracted from the total volume of gas flowing through the casing 12. As the operating handle 172 continues to be moved in the same direction, the trailing edge 141 of the port 140 will successively close off the various by-pass ports 22 so that further decreases in the volume of gas flowing through the casing 14 will be effected along with the normal decrease in gas flow occasioned by the progressive closing off of the port 20 by the trailing edge 143 of the arcuate slot or port 142 provided in the sleeve portion 102 of the sleeve valve 16.

It is to be noted that the staggered arrangement of the by-pass ports 22 in the sleeve portion 102 of the sleeve valve 16 is such that the trailing edge 141 of the slot or port 140 will move into register with any given by-pass port 22 before it has completely closed off the next preceding port orifice. In this manner, each increment of motion of the operating handle 122 is effective to cause a decrease, however slight, in gas flow through the apparatus as the valve is being closed. It will be understood, of course, that the reverse is true during opening movements of the valve and the volume of gas admitted to the outlet passage 21 during progressive movements of the sleeve valve 16 will be cumulative as the slot 140 progressively uncovers the various by-pass ports 22 and as the slot 142 progressively moves into register with the outlet port 20.

Figure 6:
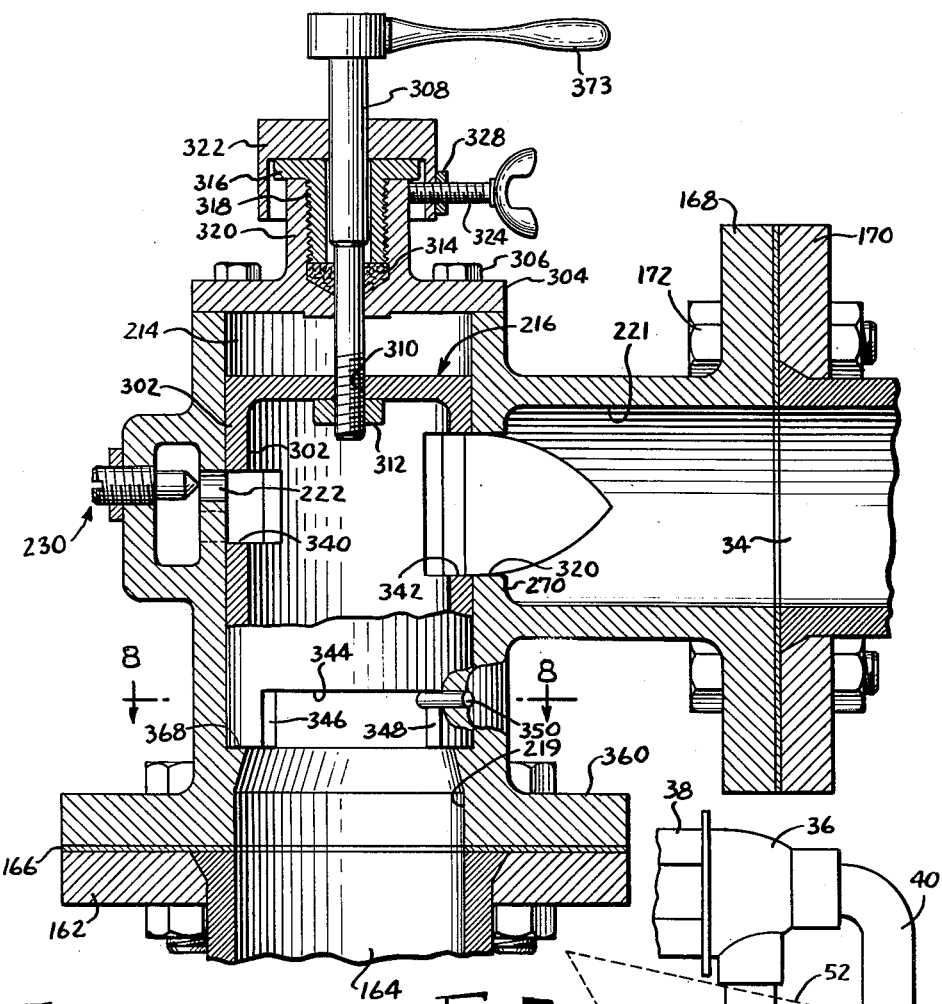
FIG. 6 is a sectional view similar to FIG. 2 showing a modified form of the control valve.

In FIG. 6 a slightly modified form of the control valve of the present invention has been illustrated. In this form of the invention, the valve casing 212, and the various main and by-pass ports associated therewith, as well as the adjusting mechanism of the sleeve valve 216 remain substantially the same as in the previously described form of the invention and, therefore, in order to eliminate needless repetition of description, similar reference characters, but of a higher numerical order have been applied to the corresponding parts in the illustrations of the two forms of the invention.

In the form of the invention shown in FIG. 6, the sleeve valve 216 is provided with a piston-like head portion 300 from which there depends a skirt or sleeve 302 having diametrically disposed slots or ports 340 and 342, respectively, formed therein. The packing gland structure 314, 316 and 318, 320 for the operating shaft 308 remains substantially the same as in the previously described form of the invention and, additionally, the adjusting nut 322 for the operating shaft 308 may be left intact although this latter structure is not utilized in the form of the invention shown in FIG. 6 since no vertical adjustments of the valve structure 216 are contemplate. The adjusting nut 322, lock nut 130 and set screw 126, by their retention in the present structure, permit the use of the same cover plate 104 or 304 when a changeover is made from either form of the sleeve valve 16 or 216 to the other form and, in such instances, except for the substitution of sleeve valves, the remaining parts of the valve assembly are not altered.

It is contemplated that the sleeve valve 216 shall at all times assume a vertical position in the valve chamber 214 so that the lower edge of the sleeve portion 302 thereof will remain in contact with the shoulder 268 at the bottom of the valve chamber 214. The arcuate slot 340 has a vertical extent which is a predetermined fraction of the vertical extent of the port 342. For example, its height may be one-half the height of this latter slot. The fluid flow capacity of the port 340 is thus one-half of the fluid flow capacity of the port 342.

Figure 8:
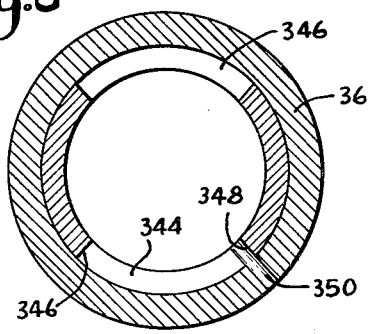
FIG. 8 is a sectional view taken substantially along the line 8—8 of FIG. 6.

The bottom of the sleeve portion 302 of the sleeve valve 316 is formed with a pair of cut away portions 344 and 346 (FIG. 8) which are diametrically disposed relative to each other. The sleeve valve 316 is reversible in the valve chamber 314, which is to say that it may be positioned in the chamber with the limit stop pin 350 projecting into either the slot 344 or the slot 346. When the valve 316 is positioned so that the pin 350 extends into the slot 344, the larger slot 342 will be capable of varying degrees of register with the outlet port 320 while the smaller slot 340 will cooperate with the various by-pass ports 222 in performing its cut-off function, as previously described, in connection with the slots 22 in the other illustrated form of the invention. When the pin 350 extends into the slot 346, the smaller slot 340 will be capable of varying degrees of register with the outlet port 320 while the larger slot 342 will cooperate with the by-pass ports 22 in performing its cut-off function.

By the arrangement described above in connection with the form of the invention shown in FIG. 6, the normal increments of decrements of gas flow through the various by-pass ports 222 will be added to or subtracted from, as the case may be, the various rates of volume flow of the gas through two basic port areas, namely, the port area of the slot 342 or the port area of the slot 240. Otherwise, the essential features of the valve structure shown in FIGS. 1 to 5, inclusive, are not disturbed.

In the accompanying drawings two operative embodiments of the invention have been shown and these two embodiments have been described herein but it is to be distinctly understood that the invention is not to be limited to the specific disclosure made. For example, while a specific form of mounting for the operating shafts 108 and 308 in the two forms of the invention has been shown, other forms of mountings are contemplated, providing, of course, that the means are included for effecting rotational adjustments of the valve in both forms of the invention and that means are included for effecting vertical adjustments of the valve in the first described form of the invention. The invention, therefore, is to be construed as broadly as the prior art will permit.

Having thus described the invention what we claim as new and desire to secure by Letters Patent is:

1. In a control valve for regulating the flow of one constituent of a gaseous mixture in accordance with the flow of another constituent of the mixture passing through a companion valve, in combination, a valve casing having a generally cylindrical wall defining a cylindrical valve chamber having one open end constituting an inlet port for said one constituent, there being an opening in the wall of said casing defining an outlet port for said one constituent, a limited circumferential extent of said cylindrical wall being hollow to define an arcuate by-pass chamber partially encompassing said valve chamber and communicating at one end thereof with the outlet side of said outlet port, there being a series of circumferentially spaced by-pass ports formed in said cylindrical wall and establishing communication between said valve chamber and by-pass chamber, individually adjustable means for varying the effective area of said by-pass ports, a rotary valve having a cylindrical sleeve portion disposed within said valve chamber and fitting against the cyindrical wall thereof, said sleeve portion of the valve being formed with a first circumferentially extending arcuate slot therein capable of progressive register with said outlet port upon turning movement of the valve relatively to the valve casing, said sleeve portion of the valve also being formed with a single second circumferentially extending elongated arcuate slot therein common to and capable of selective progressive cumulative register with said by-pass ports upon turning movement of the valve relative to the valve casing, and means extending through said valve casing and operatively connected to said valve for effecting turning movements of the latter within said valve chamber.

2. In a control valve for regulating the flow of one constituent of a gaseous mixture in accordance with the flow of another constituent of the mixture passing through a companion valve, in combination, a valve casing having a generally cylindrical wall defining a cylindrical valve chamber having one open end constituting an inlet port for said one constituent, there being an opening in the wall of said casing defining an outlet port for said one constituent, a limited circumferential extent of said cylindrical wall being hollow to define an arcuate by-pass chamber partially encompassing said valve chamber and communicating at one end thereof with the outlet side of said outlet port, there being a series of circumferentially spaced by-pass ports formed in said cylindrical wall and establishing communication between said valve chamber and by-pass chamber, a rotary valve having a cylindrical sleeve portion disposed within said valve chamber and fitting against the cylindrical wall thereof, said sleeve portion of the valve being formed with a first circumferentially extending arcuate slot therein capable of progressive register with said outlet port upon turning movement of the valve relative to the valve casing, said sleeve portion of the valve also being formed with a single second circumferentially extending elongated arcuate slot therein common to and capable of selective progressive cumulative register with said by-pass ports upon turning movement of the valve relative to the valve casing, said series of circumferentially spaced by-pass ports being arranged in two rows with the ports of the two rows being offset axially of said cylindrical wall and being disposed in circumferentially staggered relationship with respect to each other, and means extending through said valve casing and operatively connected to said valve for effecting turning movements of the latter within said valve chamber.

3. In a control valve for regulating the flow of one constituent of a mixture in accordance with the flow of another constituent of the mixture, the combination set forth in claim 2 including, additionally, individually adjustable means for varying the effective area of each of said by-pass ports.

4. In a control valve for regulating the flow of one constituent of a mixture in accordance with the flow of another constituent of the mixture passing through a companion valve, the combination set forth in claim 2 and wherein the arrangement of said by-pass ports is such that during turning movement of said valve the leading edge of said second arcuate slot therein will enter into registry with each succeeding by-pass port before completely embracing the next preceding by-pass port.

5. In a control valve for regulating the flow of one constituent of a mixture in accordance with the flow of another constituent of the mixture passing through a companion valve, the combination set forth in claim 4 including, additionally, individually adjustable means for varying the effective area of each of said by-pass ports.

6. In a gas control valve for regulating the flow of gas in accordance with the flow of air through a companion air control valve, in combination, a valve casing having a generally cylindrical wall defining a cylindrical valve chamber, said valve chamber having an open end constituting a gas inlet port, there being an opening in the wall of said casig defining a gas outlet port, a limited circumferential extent of said cylindrical wall being hollow to define an arcuate by-pass chamber partially encompassing said valve chamber and communicating at one end thereof with the outlet side of said outlet port, there being a series of circumferentially spaced by-pass ports formed in said cylindrical wall and establishing communication between said valve chamber and said by-pass chamber, individually adjustable means for varying the effective area of said by-pass ports, a valve having a cylindrical sleeve portion disposed within said valve chamber and fitting against the cylindrical wall thereof, said valve being capable of limited rotational movement within said valve chamber and also being capable of limited axial sliding movement within the chamber, said sleeve portion of the valve being formed with a first circumferentially extending arcuate slot therein capable of progressive horizontal register with said outlet port upon turning movement of the valve within the valve chamber and of progressive vertical register with said outlet port upon axial movement of the valve within the valve chamber, said sleeve portion of the valve also being formed with a single second circumferentially extending elongated arcuate slot therein common to and capable of selective progressive cumulative register with said by-pass ports upon turning movement of the valve within the valve chamber in any axial position of the valve, and means extending through said valve casing and operatively connected to the valve for effecting turning movements of the latter as well as effecting axial sliding movements thereof within the valve chamber.

7. In a gas control valve for regulating the flow of gas in accordance with the flow of air through a companion air control valve, in combination, a valve casing having a generally cylindrical wall defining a cylindrical valve chamber, said valve chamber having an open end constituting a gas inlet port, there being an opening in the wall of said casing defining a gas outlet port, a limited circumferential extent of said cylindrical wall being hollow to define an arcuate by-pass chamber partially encompassing said valve chamber and communicating at one end thereof with the outlet side of said outlet port, there being a series of circumferentially spaced by-pass ports formed in said cylindrical wall and establishing communication between said valve chamber and said by-pass chamber, a valve having a cylindrical sleeve portion disposed within said valve chamber and fitting against the cylindrical wall thereof, said valve being capable of limited rotational movement within said valve chamber and also being capable of limited axial sliding movement within the chamber, said sleeve portion of the valve being formed with a first circumferentially extending arcuate slot therein capable of progressive horizontal register with said outlet port upon turning movement of the valve within the valve chamber and of progressive vertical register with said outlet port upon axial movement of the valve within the valve chamber, said sleeve portion of the valve also being formed with a single second circumferentially extending elongated arcuate slot therein common to and capable of selective progressive cumulative register with said by-pass ports upon turning movement of the valve within the valve chamber in any axial position of the valve, said series of circumferentially spaced by-pass ports being arranged in two rows with the ports of the two rows being offset axially of said cylindrical wall and being disposed in circumferentially staggered relationship with respect to each other, and means extending through said valve casing and operatively connected to the valve for effecting turning movements of the latter as well as effecting axial sliding movements thereof within the valve chamber.

8. In a control valve for regulating the flow of gas in accordance with the flow of air through a companion air control valve, the combination set forth in claim 7, including, additionally, individually adjustable means for varying the effective area of each of said by-pass ports.

9. In a control valve for regulating the flow of gas in accordance with the flow of air through a companion air control valve, the combination set forth in claim 7 and wherein the arrangement of said by-pass ports is such that during turning movement of said sleeve valve in any axial position thereof the leading edge of said second arcuate slot will enter into registry with each succeeding by-pass port before completely embracing the next preceding by-pass port.

10. In a gas control valve for regulating the flow of gas in accordance with the flow of air through a companion air control valve, in combination, a valve casing having a generally cylindrical wall defining a cylindrical valve chamber, said valve chamber having an open end constituting a gas inlet port, there being an opening in the wall of said casing defining a gas outlet port, a limited circumferential extent of said cylindrical wall being hollow to define an arcuate by-pass chamber partially encompassing said valve chamber and communicating at one end thereof with the outlet side of said outlet port, said by-pass chamber communicating at both ends thereof with the outlet side of the outlet port, there being a series of circumferentially spaced by-pass ports formed in said cylindrical wall and establishing communication between said valve and said by-pass chamber, a valve having a cylindrical sleeve portion disposed within said valve chamber and fitting against the cylindrical wall thereof, said valve being capable of limited rotational movement within said valve chamber and also being capable of limited axial sliding movement within the chamber, said sleeve portion of the valve being formed with a first circumferentially extending arcuate slot therein capable of progressive horizontal register with said outlet port upon turning movement of the valve within the valve chamber and of progressive vertical register with said outlet port upon axial movement of the valve within the valve chamber, said sleeve portion of the valve also being formed with a single second circumferentially extending elongated arcuate slot therein common to and capable of selective progressive cumulative register with said by-pass ports upon turning movement of the valve within the valve chamber in any axial position of the valve, and means extending through said valve casing and operatively connected to the valve for effecting turning movements of the latter as well as effecting axial sliding movements thereof within the valve chamber.

11. In a control valve for regulating the flow of one constituent of a combustible mixture in accordance with the flow of another constituent of the mixture passing through a companion valve, in combination, a valve casing having a generally cylindrical wall defining a cylindrical valve chamber having one open end defining an outlet port for said one constituent, there being an opening in the wall of said casing defining an outlet port for said one constituent, a limited circumferential arcuate extent of said cylindrical wall being hollow to define an arcuate by-pass chamber partially encompassing said valve chamber and communicating at at least one end thereof with the outlet side of said outlet port, there being a series of circumferentially spaced by-pass ports formed in said cylindrical wall and establishing communication between said valve chamber and by-pass chamber, a rotary valve having a cylindrical sleeve portion disposed within said valve chamber and fitting against the cylindrical wall thereof, said sleeve portion being formed with a first circumferentially extending arcuate slot therein of predetermined size and with a second circumferentially extending arcuate slot therein of a different predetermined size, said arcuate slots being diametrically opposed to each other across the portion of the valve, said valve being selectively receivable within said valve chamber so that either arcuate slot in the sleeve portion thereof is capable of progressive register with said outlet port upon turning movement of the valve within said valve chamber while the other arcuate slot is capable of selective cumulative register with said by-pass ports upon such turning movement of the valve, and means extending through said valve casing and operatively connected to said valve for effecting turning movements of the latter within said valve chamber.

12. In a control valve for regulating the flow of one constituent of a combustible mixture in accordance with the flow of another constituent of the mixture passing through a companion valve, the combination set forth in claim 11 including, additionally, individually adjustable means for varying the effective area of each of said by-pass ports.

13. In a control valve for regulating the flow of one constituent of a combustible mixture in accordance with the flow of another constituent of the mixture passing through a companion valve, in combination, a valve casing providing an internal valve chamber, means providing an inlet port for the inflow of said one constituent to said valve chamber adjacent one end thereof, there being an opening in the wall of said chamber defining an outlet port for the outflow of said constituent from the chamber, said casing also providing a by-pass chamber offset from said valve chamber and communicating with the outlet side of said outlet port, there being a series of spaced by-pass ports in said casing establishing communication between the valve chamber and by-pass chamber, a valve member disposed within said valve chamber and provided with a first leading cut-off edge and capable upon movement of the valve member in one direction of progressive register with said outlet port, said valve member also being provided with a second leading cut-off edge capable of selective progressive cumulative register with said by-pass ports upon movement of the valve member in said one direction, and means extending through said valve casing and operatively connected to said valve member for effecting movement of the latter within said valve chamber.

14. In a control valve for regulating the flow of one constituent of a combustible mixture in accordance with the flow of another constituent of the mixture passing through a companion valve, the combination set forth in claim 13 including, additionally, individual means for regulably varying the effective area of each of said by-pass ports.

15. In a control valve for regulating the flow of one constituent of a combustible mixture in accordance with the flow of another constituent of the mixture passing through a companion valve, the combination set forth in claim 13 wherein said casing is formed with a second and adjacent series of spaced by-pass ports establishing communication between the valve chamber and by-pass chamber, the ports of the adjacent series being arranged in staggered relationship in two adjacent rows.

16. In a control valve for regulating the flow of one constituent of a combustible mixture in accordance with the flow of another constituent of the mixture passing through a companion valve, the combination set forth in claim 13 wherein said casing is formed with a second and adjacent series of spaced by-pass ports establishing communication between the valve chamber and by-pass chamber, the ports of the adjacent series being arranged in staggered relationship in two adjacent rows, the arrangement of said by-pass ports in the two adjacent rows being such that said second leading cut-off edge of the valve member will enter into register with each succeeding by-pass port before completely embracing the next preceding by-pass port.

17. In a control valve for regulating the flow of one constituent of a combustible mixture in accordance with the flow of another constituent of the mixture passing through a companion valve, the combination set forth in claim 13 wherein said casing is formed with a second and adjacent series of spaced by-pass ports establishing communication between the valve chamber and by-pass chamber, the ports of the adjacent series being arranged in staggered relationship in two adjacent rows, the arrangement of said by-pass ports in the two adjacent rows being such that the second leading cut-off edge of the valve member will enter into register with each succeeding by-pass port before completely embracing the next preceding by-pass port, and individual means for regulably varying the effective area of each of said by-pass ports.

References Cited in the file of this patent

UNITED STATES PATENTS

| | | |
|---|---|---|
| 1,019,747 | Barnes | Mar. 12, 1912 |
| 1,139,221 | Potter | May 11, 1915 |
| 1,357,294 | McKee | Nov. 2, 1920 |
| 1,529,457 | Wild | Mar. 20, 1925 |
| 2,510,617 | Barr | June 6, 1950 |

FOREIGN PATENTS

| | | |
|---|---|---|
| 25,641 | Great Britain | of 1907 |
| 424,024 | Great Britain | Feb. 13, 1935 |